(12) United States Patent
Otobe

(10) Patent No.: US 6,535,304 B1
(45) Date of Patent: Mar. 18, 2003

(54) SIGNAL PROCESSING APPARATUS

(75) Inventor: Mutsumi Otobe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/075,227

(22) Filed: May 11, 1998

(30) Foreign Application Priority Data

May 12, 1997 (JP) .............................................. 9-120655

(51) Int. Cl.[7] .................................................. H04N 1/32
(52) U.S. Cl. ........................ 358/468; 358/475; 382/320
(58) Field of Search ................ 382/320, 314; 358/475, 468

(56) References Cited

U.S. PATENT DOCUMENTS

| | | | |
|---|---|---|---|
| 4,789,903 A | 12/1988 | Kamada et al. | 358/296 |
| 4,835,403 A | 5/1989 | Wisniewski | 250/561 |
| 5,140,445 A * | 8/1992 | Takashima | 358/483 |
| 5,153,745 A * | 10/1992 | Brandkamp et al. | 358/406 |
| 5,414,269 A | 5/1995 | Takahashi | 250/561 |
| 5,592,306 A * | 1/1997 | Cheng | 358/464 |
| 5,745,262 A * | 4/1998 | Tatsumi | 358/504 |
| 5,834,857 A | 11/1998 | Abe et al. | 307/66 |
| 5,854,694 A * | 12/1998 | Payne et al. | 358/473 |

FOREIGN PATENT DOCUMENTS

| | | | | |
|---|---|---|---|---|
| EP | 0 539 857 A1 | 5/1993 | | B41J/29/44 |
| JP | 7-298612 A | 11/1995 | | H02M/3/28 |

* cited by examiner

Primary Examiner—Thomas D. Lee
(74) Attorney, Agent, or Firm—Oliff & Berridge, PLC

(57) ABSTRACT

A signal processing apparatus is provided which includes a signal processing circuit for processing a weak signal susceptible to noises, an electronic component which is selectively energized and de-energized, and a controller for controlling the operation of the electronic component. The controller first determines initiation and termination of the weak signal processing. Upon determination of the initiation of the weak signal processing, the controller causes the electronic component to be continuously energized. Upon determination of the termination of the weak signal processing, the controller causes the electronic component to be intermittently energized.

10 Claims, 4 Drawing Sheets

SIGNAL PROCESSING APPARATUS

BACKGROUND OF THE INVENTION

1. Field of the Invention

The present invention relates to a signal processing apparatus which incorporates a signal processing circuit for processing weak signals susceptible to noises.

2. Description of the Related Art

Generally, a facsimile machine is well known as a machine incorporating a signal processing apparatus for processing relatively weak signals. Here, weak signals may include image signals at a reading section of the facsimile machine and aural signal at a calling section of the same machine.

The facsimile machine also includes optical sensing components for detecting image carrying paper sheets and recording paper sheets. Such an optical sensor may include a light emitting element such as an LED, and a light receiving element such as a phototransistor.

In the conventional facsimile machine, the LED as a light emitting element is periodically turned on and off by a pulse current for example. This is because if the LED is kept on for continuous light emission, it will lose its initial light-emitting performance, whereby the sensitivity of the optical sensor will be disadvantageously deteriorated. Further, if the LED is kept turned on, the life span of the LED will be unfavorably shortened.

However, when the LED is periodically turned on and off in the conventional manner described above, there is a problem of generating unfavorable noises in weak signal processing circuits due to the pulse currents. Those noises will unduly affect the weak signals, whereby the weak signal processing is not properly performed.

SUMMARY OF THE INVENTION

It is, therefore, an object of the present invention is to provide a signal processing apparatus for properly processing weak signal, such as image signals, without being affected by noises generated due to a pulse current.

According to one aspect of the present invention, there is provided a signal processing apparatus including a signal processing circuit for processing a weak signal susceptible to noises; an electronic component which is selectively energized and de-energized; a start/end determiner for determining initiation and termination of the weak signal processing; a conduction holder for causing the electronic component to be continuously energized when the start/end determiner determines the initiation of the weak signal processing; and a state changer for causing the electronic component to be intermittently energized when the start/end determiner determines the termination of the weak signal processing.

With such an arrangement, when the weak signal is processed, the electronic component is continuously energized, thereby generating no noise to affect the weak signal processing.

According to a preferred embodiment, the electronic component may include an optical sensor.

The weak signal may be or an image signal for example.

The conduction holder may cause the electronic component to be continuously energized by a steady current. On the other hand, the state changer may cause the electronic component to be intermittently energized by a pulse current.

According to a preferred embodiment, the start/end determiner, the conduction holder and the state changer may be provided by a central processing unit of a machine which incorporates the signal processing apparatus.

According to a preferred embodiment, the machine may be a facsimile machine.

According to another aspect of the present invention, there is provided a signal processing apparatus including a signal processing circuit for processing a weak signal susceptible to noises, an electronic component which is selectively energized and de-energized; and a controller for controlling the operation of the electronic component. The controller determines initiation and termination of the weak signal processing. The controller further causes the electronic component to be continuously energized upon determination of the initiation of the weak signal processing. The controller further causes the electronic component to be intermittently energized upon determination of the termination of the weak signal processing.

Other objects, features and advantages of the present invention will be apparent from the detailed description of the embodiment given below with reference to the accompanying drawings.

DETAILED DESCRIPTION OF THE PREFERRED EMBODIMENT

The preferred embodiment of the present invention will be described below with reference to the accompanying drawings.

Figure 1:
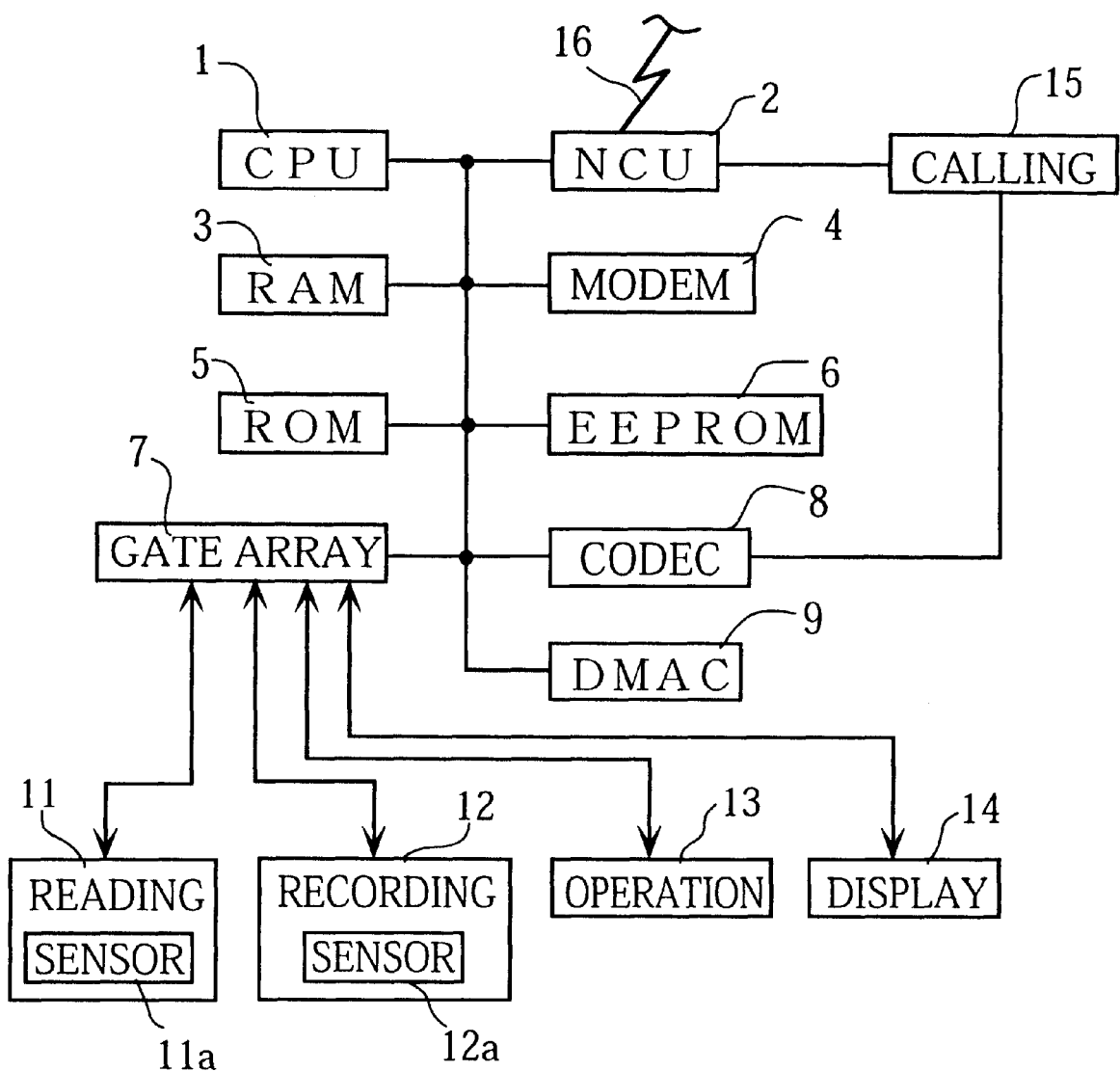
FIG. 1 is a block diagram showing a facsimile machine which incorporates a signal processing apparatus according to an embodiment of the present invention.

Reference is first made to FIG. 1 which is a circuit block diagram showing a principal portion of a signal processing apparatus incorporated in a facsimile machine embodying the present invention. This facsimile machine comprises a CPU (central processing unit) 1, an NCU (network control unit) 2, a RAM (random access memory) 3, a modem (modulator-demodulator) 4, a ROM (read-only memory) 5, an EEPROM (electrically erasable and programmable ROM) 6, a gate array 7, a codec (coder-decoder) 8, and a DMAC (direct memory access controller) 9. Further, the facsimile machine also comprises a reading section 11, a recording section 12, an operation section 13, a display section 14 and a calling section 15.

The CPU 1, the NCU 2, the RAM 3, the modem 4, the ROM 5, the EEPROM 6, the gate array 7, the codec 8 and the DMAC 9 are connected to each other via bus lines (digital lines). The bus lines include data bus lines, address bus lines and control signal bus lines. The gate array 7 is connected to the reading section 11, the recording section 12, the operation section 13 and the display section 14, respectively. The calling section 15 is connected to the NCU 2 and the codec 8. The NCU 2 is connected to a telephone line 16.

The CPU 1 provides an overall control of the facsimile machine as a whole.

The NCU 2 is connected to the telephone line 16 for providing network control. The NCU 2 is also connected to the modem 4 through an analog line.

The RAM 3 stores digital data such as image data and the like. Of course, an additional RAM or RAMs may be provided to increase the capacity of data storage.

The modem 4 modulates the transmitting codes and demodulates the received codes.

The ROM 5 stores various programs or the like as required for controlling the facsimile machine, whereas the EEPROM 6 stores registered data (e.g. shortcut dials) and/or flags.

The gate array 7 functions as a I/O interface (input/output interface) for the CPU 1 for data transmission to and/or from the reading section 11, the recording section 12, the operation section 13 and the display section 14.

The codec 8 performs coding of the transmitting image data and decoding of the received image data, for example.

The DMAC 9 provides memory access control with respect to the RAM 3 for example.

The reading section 11 includes an image sensor for reading out the image data from an image carrying paper sheet (not shown). The reading section also includes an optical sensor 11a for detecting the presence or absence of an image carrying paper sheet. The sensor 11a may include LED for a light source and a phototransistor for a light receiving element.

The recording section 12 performs printing of images on a recording paper sheet (not shown) on the basis of the image data received through the gate array 7. Like the reading section 11, the recording section 12 includes an optical sensor 12a for detecting the presence or absence of a recording paper sheet (not shown). The sensor 12a also may include an LED for a light source and a phototransistor for a light receiving element.

The operation section 13 has key switches to be operated by the user for output of operation signals, whereas the display section 14 includes an LCD or the like for providing various indications under the control of the CPU 1. The calling section 15, which is provided with a handset including a receiver and a transmitter, controls aural signals transmitted via the telephone line 16. The calling section 15 has an answering function. Thus, when the user is out and cannot answer an incoming call for example, the aural signals are sent to the codec 8 to be converted into digital signals. The digitized signals are stored in the RAM 3.

The gate array 7, the reading section 11, the recording section 12, the operation section 13, the display section 14 and the calling section 15 are provided with a suitable signal processing circuit, respectively.

Here, it should be appreciated that certain signals such as operation signals supplied by the operation section 13 and printer-driving signals supplied to the recording section 12 are relatively strong signals which are not easily affected by noises. On the other hand, image signals supplied by the image sensor and the aural signals transmitted from the calling section 15 to the NCU 2 or codec 8 are relatively weak signals which are susceptible to noises.

Based on the programs stored in the ROM 5, the CPU 1 determines that the facsimile machine is in a ready mode, when no telephone call is made nor facsimile transmission is performed. Thus, in the ready mode, weak signals such as image signals and aural signals will not be processed. In the ready mode, the LEDs of the sensors 11a and 12a are alternatively turned on and off by a pulse current, so that the LEDs intermittently emit light. The detection of an image carrying paper sheet and a recording paper sheet is performed when the LEDs are turned on.

Further, the CPU 1 determines that the facsimile machine is in a weak signal processing mode, when a telephone call is made or facsimile transmission is performed. For instance, when the handset is picked up by the user, the CPU 1 determines that the facsimile machine is brought into a weak signal processing mode. According to the present invention, in the weak signal processing mode, steady currents are supplied to the LEDs, so that the LEDs are kept energized to continuously emit light. Thereafter, when the handset is returned to the original position, the CPU 1 determines that the weak signal processing mode ends and causes the pulse current to be supplied to the sensors 11a and 12a.

Figure 2:
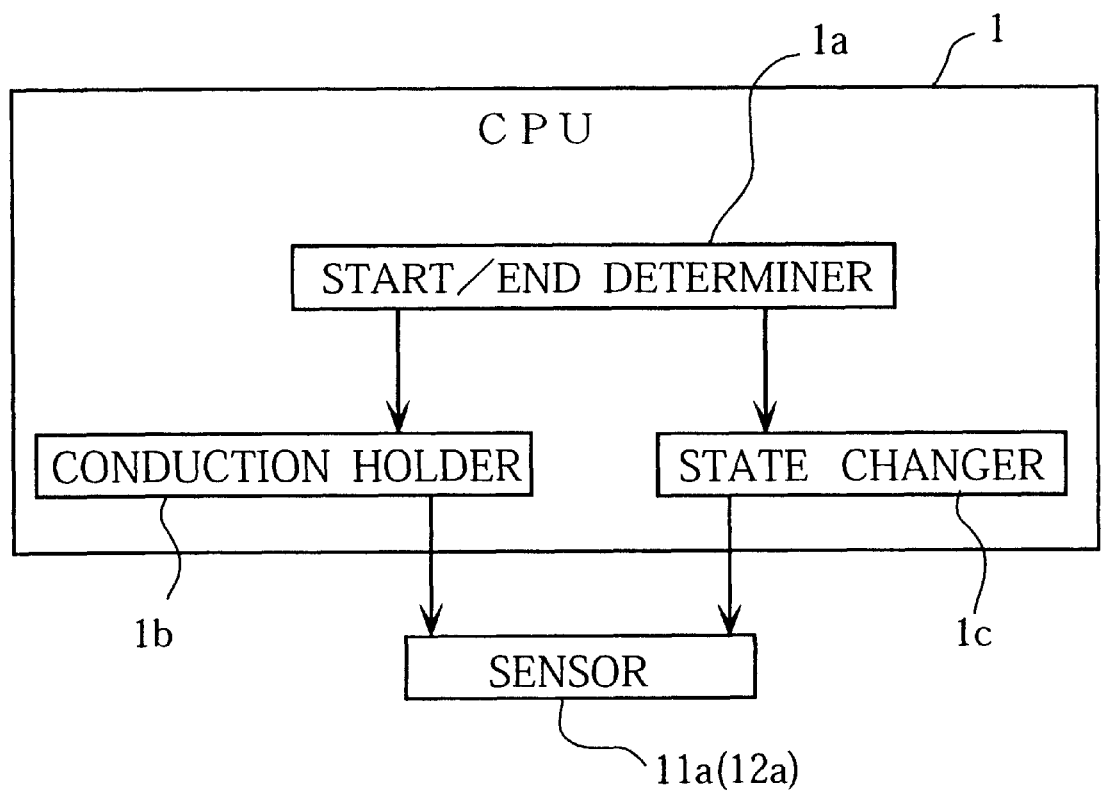
FIG. 2 is a block diagram showing an arrangement of a CPU which is advantageously used for the facsimile machine illustrated in FIG. 1.

For performing the above-described operations, the CPU 1 includes a start/end determiner 1a, a conduction holder 1b and a state changer 1c, as shown in FIG. 2. Specifically, the start/end determiner 1a is provided for determining the initiation and termination of the weak signal processing in the signal processing circuits of the reading section 11 and the calling section 15. The conduction holder 1b is provided for keeping the LEDs energized when the facsimile machine is in the weak signal processing mode. The state changer 1c is provided for causing the LEDs to be alternately turned on and off when the facsimile machine is in the ready mode.

Figure 3:
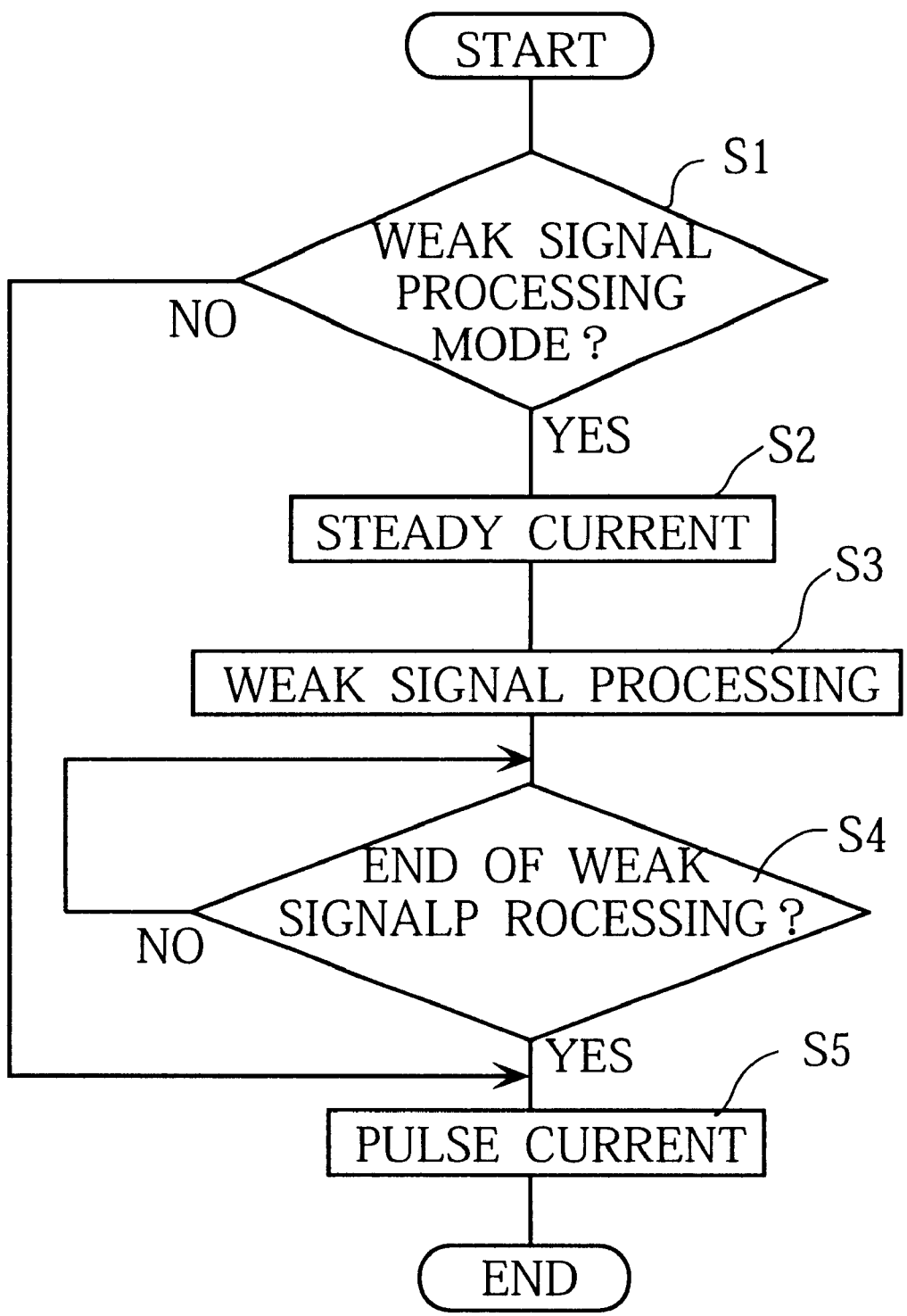
FIG. 3 is a flow diagram showing the steps of a weak signal processing mode.
Figure 4:
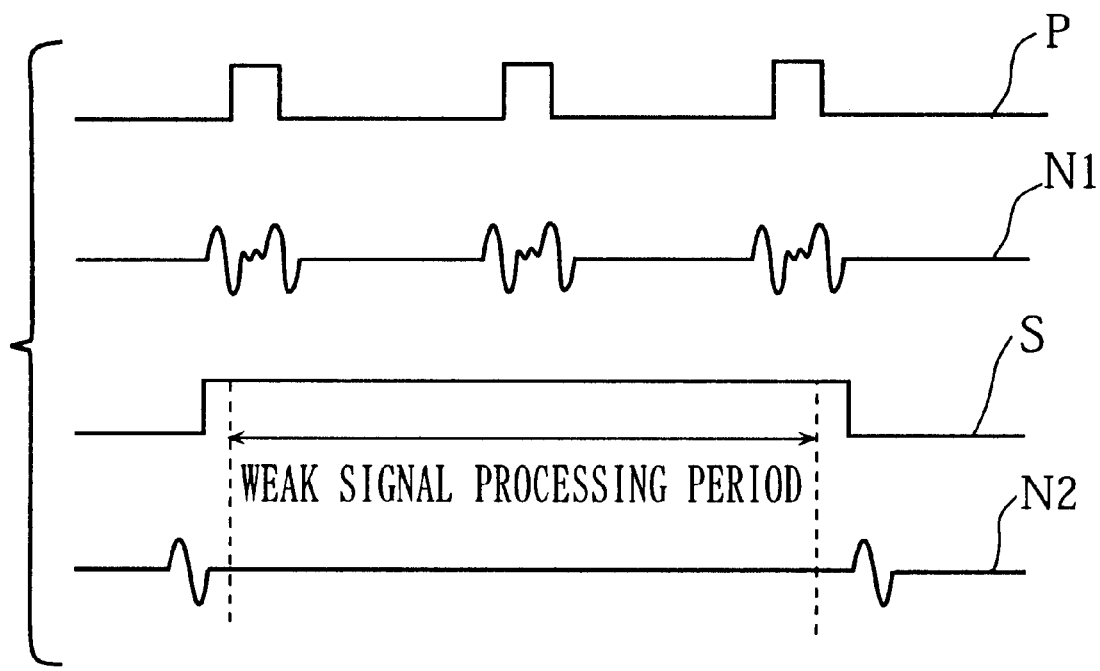
FIG. 4 is a time chart illustrating a pulse current (P), a steady current (S) and noises (N1 and N2), wherein the two currents are supplied to a sensor of the facsimile machine.

Referring to FIGS. 3 and 4, description is now made to the weak signal processing mode of the facsimile machine.

FIG. 3 is a flow diagram showing how the weak signal processing mode proceeds. First, the CPU 1 determines whether the facsimile machine is in the weak signal processing mode or in the ready mode (S1) on the basis of signals transmitted from the reading section 11 and the calling section 15.

When determining that the weak signal processing mode starts (YES in S1), the CPU 1 causes a steady current to be supplied to the sensors 11a and 12a of the reading section 11 and the recording section 12 (S2). As a result, the LEDs of the sensors continuously emit light.

In this state, weak signals in the reading section 11 and the calling section 15 can be processed (S3) without being affected by any noise.

Then, the CPU 1 determines whether or not the facsimile machine is still in the weak signal processing mode (S4).

When the the CPU 1 determines that the processing mode ends (YES in S4), the facsimile machine is brought into the ready mode. In the ready mode, a pulse current is supplied to the sensors 11a and 12a (S5) again. Thus, the illustrated main routine ends.

When determining that the weak signal processing is still performed (NO in S4), the CPU 1 continues to cause the steady current to be supplied to the sensors 11a and 12a.

Referring to the step S1, when determining that the facsimile machine is not in the weak signal processing mode (NO), the CPU 1 continues to cause the pulse current to be supplied to the sensors 11a and 12a (S5).

FIG. 4 is a time chart in which a pulse current (P) and a steady current (S) supplied to the sensors 11a and 12a are shown. The figure also shows noises N1 and N2. As illustrated, noises occur when a current rises from a low level to a high level as well as when it falls from the high level to the low level.

According to the present invention, however, when the facsimile machine is in the weak signal processing mode, the steady current (S) is supplied to the sensors 11a and 12a, as already described. Therefore, no noise is generated while the weak signal processing is performed. As a result, it is possible to process the weak signals without being affected by noises.

Further, according to the present invention, the LEDs of the sensors 11a and 12a are continuously energized only when a phone call is made or facsimile transmission is performed (namely, only when the facsimile machine is in the weak signal processing mode). Thus, the continuous actuation time for the LEDs is much shorter as compared with the life span of the facsimile machine as a whole. Therefore, it is possible to prevent the light-emitting performance of the LEDs from unfavorably deteriorating. Thus, it is possible to maintain the initial sensitivity of the sensors 11a and 12a for a longer time.

In the embodiment described above, the sensors 11a and 12a are provided in the reading section 11 and the recording section 12 only. However, this feature is not limitative. For instance, an additional optical sensor may be mounted on a cover of the facsimile machine for checking if the cover is opened or closed.

The present invention being thus described, it is obvious that the same may be varied in many ways. Such variations should not be regarded as a departure from the spirit and scope of the present invention, and all such modifications as would be obvious to those skilled in the art are intended to be included within the scope of the following claims.

What is claimed is:

1. A signal processing apparatus comprising:
    an optical sensor which is selectively energized and de-energized;
    a signal processing circuit that processes a weak signal susceptible to noises;
    a start/end determiner that determines initiation and termination of the weak signal processing;
    a conduction holder that causes the optical sensor to be continuously energized for preventing generation of noises in the signal processing circuit when the start/end determiner determines the initiation of the weak signal processing; and
    a state changer that causes the optical sensor to be intermittently energized by a pulse current when the start/end determiner determines the termination of the weak signal processing;
    wherein said noises are caused by said pulse current.

2. The signal processing apparatus according to claim 1, wherein the conduction holder causes the optical sensor to be continuously energized by a steady current.

3. The signal processing apparatus according to claim 1, wherein the start/end determiner, the conduction holder and the state changer are provided by a central processing unit of a machine which incorporates the signal processing apparatus.

4. The signal processing apparatus according to claim 3, wherein the optical sensor detects presence or absence of a sheet member.

5. A signal processing apparatus comprising:
    an optical sensor which is selectively energized and de-energized;
    a signal processing circuit that processes a weak signal susceptible to noises;
    a controller that controls the operation of the optical sensor;
    wherein the control determines initiation and termination of the weak signal processing, the controller further causing the optical sensor to be continuously energized for preventing generation of noises in the signal processing circuit upon determination of the initiation of the weak signal processing, the controller further causing the optical sensor to be intermittently energized by a pulse current upon determination of the termination of the weak signal processing; and
    wherein said noises are caused by said pulse current.

6. The signal processing apparatus according to claim 5, wherein the optical sensor detects presence or absence of a sheet member.

7. A facsimile machine comprising:
    a reading section that reads out images from an image carrying sheet member;
    a recording section that performs printing on a recording sheet member;
    an optical sensor which is selectively energized and de-energized for detecting presence or absence of the recording sheet member;
    a signal processing circuit that processes a weak signal susceptible to noises;
    a start/end determiner that determines initiation and termination of the weak signal processing;
    a conduction holder that causes the optical sensor to be continuously energized for preventing generation of noises in the signal processing circuit when the start/end determiner determines the initiation of the weak signal processing; and
    a state changer that causes the optical sensor to be intermittently energized by a pulse current when the start/end determiner determines the termination of the weak signal processing;
    wherein said noises are caused by said pulse current.

8. The facsimile machine according to claim 7, wherein the weak signal comprises image signals supplied by the reading section.

9. The facsimile machine according to claim 8, the conduction holder causes the optical sensor to be continuously energized by a steady current.

10. The facsimile machine according to claim 7, wherein the start/end determiner, the conduction holder and the state changer are provided by a central processing unit.

* * * * *